(12) United States Patent
Zhang et al.

(10) Patent No.: US 12,224,456 B2
(45) Date of Patent: Feb. 11, 2025

(54) CONNECTION COMPONENT, BATTERY CELL, BATTERY AND ELECTRICAL DEVICE

(71) Applicant: CONTEMPORARY AMPEREX TECHNOLOGY (HONG KONG) LIMITED, Hong Kong (CN)

(72) Inventors: Lingyu Zhang, Ningde (CN); Jianxiong Yang, Ningde (CN); Zhijun Guo, Ningde (CN); Haibo Ke, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 560 days.

(21) Appl. No.: 17/565,632

(22) Filed: Dec. 30, 2021

(65) Prior Publication Data

US 2022/0352604 A1 Nov. 3, 2022

Related U.S. Application Data

(63) Continuation of application No. PCT/CN2021/091335, filed on Apr. 30, 2021.

(51) Int. Cl.
*H01M 50/531* (2021.01)
*H01M 50/533* (2021.01)

(52) U.S. Cl.
CPC ....... *H01M 50/531* (2021.01); *H01M 50/533* (2021.01); *H01M 2220/20* (2013.01)

(58) Field of Classification Search
CPC .......................... H01M 50/533; H01M 50/531
See application file for complete search history.

(56) References Cited

U.S. PATENT DOCUMENTS 3,732,124 A * 5/1973 Cailley ............... H01M 50/536
429/211
3,837,925 A * 9/1974 Cailley ............... H01M 50/538
429/161
(Continued)

FOREIGN PATENT DOCUMENTS

CN 1890157 A 1/2007
CN 201169407 Y 12/2008
(Continued)

OTHER PUBLICATIONS

Machine Translation of CN-110299502-A (Jul. 16, 2024) (Year: 2024).*
(Continued)

*Primary Examiner* — Matthew J Merkling
(74) *Attorney, Agent, or Firm* — Scully, Scott, Murphy & Presser, P.C.

(57) ABSTRACT

The present application provide a connection component, a battery cell, a battery, and an electric device. The connection component includes a body, a convex portion, a concave portion and a gap control portion, and the body includes a first surface and a second surface opposite to each other in a thickness direction thereof; and the gap control portion is configured to be when the associated connection component is stacked on the other connection component, said gap control portion is in contact with said the other connection component, so as to control a dimension of a gap D between the two connection components to be greater than 0.6H, wherein H is the height of the convex portion protruding from the first surface. According to the connection component provided by the present application, the gap between two adjacent connection components can be controlled when material is stuck.

14 Claims, 7 Drawing Sheets

(56) References Cited

U.S. PATENT DOCUMENTS

| | | | |
|---|---|---|---|
| 7,318,980 B2* | 1/2008 | Kim | H01M 50/538 |
| | | | 429/211 |
| 7,927,739 B2* | 4/2011 | Issaev | H01M 50/119 |
| | | | 429/188 |
| 8,534,460 B2 | 9/2013 | Wnek et al. | |
| 8,708,148 B2 | 4/2014 | Wnek et al. | |
| 9,315,292 B2 | 4/2016 | Wnek et al. | |
| 9,725,210 B2 | 8/2017 | Wnek et al. | |
| 10,077,134 B2 | 9/2018 | Wnek et al. | |
| 10,236,094 B2* | 3/2019 | Hong | C25D 7/00 |
| 2005/0109653 A1 | 5/2005 | Wnek et al. | |
| 2005/0112468 A1* | 5/2005 | Berkowitz | H01M 50/536 |
| | | | 429/231.5 |
| 2008/0218082 A1* | 9/2008 | Boy | H01T 4/12 |
| | | | 313/631 |
| 2009/0208830 A1 | 8/2009 | Okabe et al. | |
| 2011/0272317 A1 | 11/2011 | Wnek et al. | |
| 2013/0217555 A1 | 8/2013 | Wnek et al. | |
| 2014/0191024 A1 | 7/2014 | Wnek et al. | |
| 2015/0225120 A1 | 8/2015 | Wnek et al. | |
| 2020/0328384 A1 | 10/2020 | Liang et al. | |
| 2020/0411807 A1 | 12/2020 | Yang | |
| 2021/0242521 A1 | 8/2021 | Yang | |

FOREIGN PATENT DOCUMENTS

| | | | | |
|---|---|---|---|---|
| CN | 110176557 A | 8/2019 | | |
| CN | 209200016 U | 8/2019 | | |
| CN | 110299502 A | * 10/2019 | | H01M 50/15 |
| CN | 209766569 U | 12/2019 | | |
| EP | 3758102 A1 | 12/2020 | | |
| WO | 2018006127 A1 | 1/2018 | | |

OTHER PUBLICATIONS

International Search Report and Written Opinion dated Jan. 29, 2022 received in International Application No. PCT/CN2021/091335.

Extended European Search Report dated Feb. 6, 2023 received in European Patent Application No. EP 21815092.8.

* cited by examiner

CONNECTION COMPONENT, BATTERY CELL, BATTERY AND ELECTRICAL DEVICE

This application is a continuation of International Application No. PCT/CN2021/091335, filed on Apr. 30, 2021, which is hereby incorporated herein by reference in its entirety.

TECHNICAL FIELD

The present application relates to the field of battery technologies, and in particular, to a connection component, a battery cell, a battery and an electric device.

BACKGROUND

A connection component is one of the important components of a battery, and is used for connecting an electrode terminal of a battery cell and an electrode assembly, so as to conduct electric energy of the electrode assembly by means of the electrode terminal.

In a manufacturing process of a battery, a plurality of connection components are generally stacked in a tools fixture, and adjacent connection components are prone to stacking sheets and materials, resulting in picking up two or more connection components at a time when taking materials from the tools fixture, and affecting the production efficiency of the battery.

SUMMARY

The purpose of the present application is to provide a connection component, thereby being able to control a dimension of a gap between two adjacent connection components when stacked, reducing the risk of material stuck, and improving the production efficiency.

The present application is achieved by the following technical solutions:

In the first aspect, the present application provides a connection component for connecting an electrode assembly and an electrode terminal. The connection component including:
- a body, including a first surface and a second surface opposite to each other in a thickness direction thereof;
- a convex portion, connected to the body and protruding from the first surface;
- a concave portion, provided on the second surface and corresponding to the position of the convex portion; and
- a gap control portion, configured to be when the associated connection component is stacked on the other connection component, said gap control portion is in contact with said the other connection component, so as to control a dimension of a gap D between the two connection components to be greater than 0.6H, wherein H is the height of the convex portion protruding from the first surface.

According to the connection component in the embodiments of the present application, a convex portion of one connection component corresponds to a concave portion of the other connection component when two connection components are stacked. As the connection component is provided with a gap control portion, the gap control portion of the associated connection component is in contact with the other connection component, and a dimension of a gap D between the two connection components is controlled to be greater than 0.6H by means of the gap control portion, so that most area of the convex portion of the associated connection component is located outside the concave portion of the other connection component, thereby reducing the overlapping area of the two connection components, effectively reducing the risk of materials jamming between the two stacked connection components, facilitating materials picking during production, and improving the production efficiency.

In some embodiments of the present application, the convex portion includes end wall and side wall, the side wall is provided surrounding the end wall in the vicinity of the end wall, the side wall is connected to the body, and the end wall combined with the side wall forms the concave portion.

In some embodiments of the application, an included angle between the side wall and the end wall is greater than 90°.

In the described solution, an included angle between the side wall and the end wall is set to be an obtuse angle, thereby facilitating processing and manufacturing (for example, facilitating demolding):

In some embodiments of the present application, the gap control portion includes a first protrusion, and the first protrusion is provided at the connection between the convex portion and the body and is exposed on the second surface.

In the described solution, by establishing the first protrusion at the connection between the convex portion and the body and exposing it on the second surface, the simplicity of structure has been improved; This establishment also keeps the associated connection component of the protrusion from entering the concave portion of the other connection component, reducing the overlapping area of the two connection components, providing a good gap dimension control effect, reducing or avoiding the risk of material stuck between the two connection components.

In some embodiments of the present application, the first protrusion is an annular protrusion extending in a circumferential direction of the protrusion; or, there are a plurality of first protrusions, and the plurality of first protrusions are spaced apart from each other in the circumferential direction of the convex portion.

In the described solution, in the case that the first protrusion is an annular protrusion, when the associated connection component is stacked on the other connection component, and the first protrusion has a relatively large contact area with the other connection component, which results in a stable stacking support of the two connection components, as well as an effectively control of the depth of the convex portion of the associated connection component penetrating the concave portion of the other connection component, thus reducing the risk of material stuck between the two connection components; in the case that there are a plurality of first protrusions, and the associated connection component is stacked on the other connection component, the plurality of first protrusions can increase the contact position of the two connection components in the circumferential direction of the convex portion, so as to form a plurality of positions for stacking support, thereby ensuring the stability of stacking support of the two connection components, an effective control of the depth of the convex portion of the associated connection component penetrating the concave portion of the other connection component, thus reducing the risk of material stuck between the two connection components.

In some embodiments of the present application, the gap control portion includes groove, the groove is provided on an outer surface of the convex portion and is located at the connection between the end wall and the side wall, and the groove is provided enclosing the end wall.

In the described solution, when the two connection components are stacked, the body of one connection component is matched with the groove of the other connection component, and the gap between the two connection components is limited by a step formed by the groove, ensuring an effective control of the gap dimension between the two adjacently stacked connection components.

In some embodiments of the present application, the gap control portion includes a second protrusion, and the second protrusion is provided on the body and protrudes from the first surface and/or the second surface.

In the described solution, a second protrusion is provided on the body, and when the associated connection component of the second protrusion is stacked with the other connection component, the abutment of the associated connection component to the other connection component is achieved, ensuring an effective control of a gap dimension between the two connection components.

In some embodiments of the present application, the second protrusion protrudes from the first surface and is obliquely provided towards the concave portion; or, the second protrusion protrudes from the second surface and is obliquely provided towards the concave portion.

In the described solution, the second protrusion is obliquely provided, which effectively controls a dimension of a gap between the two adjacently stacked connection components, thus reducing the risk of material stuck.

In some embodiments of the present application, there are a plurality of second protrusions, and said plurality of second protrusions are distributed surrounding the concave portion at intervals.

In the described solution, said plurality of second protrusions are provided, which results in the two connection components contacting with each other at a plurality of positions, ensuring the support stability, and improving the effect of controlling the gap dimension between the two adjacently stacked connection components.

In some embodiments of the present application, the convex portion is located on a width central line of the connection component, and said plurality of second convex portions are symmetrically distributed with respect to the width central line.

In the described solution, said plurality of second protrusions are symmetrically distributed, when the associated connection component is stacked with another connection component, thereby ensuring that the two connection components are stacked and supported stably, and facilitating the control of the gap dimension between the two connection components.

In some embodiments of the present application, at least one second protrusion is provided at an edge of the body.

In the described solution above, the second protrusion is provided at the edge of the body, thereby facilitating the processing and manufacturing.

In a second aspect, the present application further provides a battery cell, including:
an electrode assembly;
an electrode terminal; and,
a connection component as described above, where the body is connected to the electrode assembly, and the convex portion is connected to the electrode terminal.

In a third aspect, the present application further provides a battery, including the battery cell as described above.

In a fourth aspect, the present application further provides an electric device, including the battery described above.

In a fifth aspect, the present application further provides a method for manufacturing a battery cell. The method includes: providing electrode assembly; providing electrode terminal; providing connection component, the connection component including body, convex portion, concave portion and gap control portion, where the body includes a first surface and a second surface opposite to each other in a thickness direction thereof, the convex portion is connected to the body and protrudes from the first surface, the concave portion is provided on the second surface and matches the position of the convex portion, and the gap control portion is configured to be when the associated connection component is stacked on another connection component, the gap control portion contacts with said another connection component, so as to control a dimension of a gap D between the two connection components to be greater than 0.6H, where H is the height of the convex portion protruding from the first surface; and connecting the body to the electrode assembly, and connecting the protruding portion to the electrode terminal.

In a sixth aspect, the present application further provides a device for manufacturing a battery cell. The device includes: first providing module used for providing electrode assembly; second providing module used for providing electrode terminal; and a third providing module used for providing connection component, the connection component including body, convex portion, concave portion and gap control portion, where the body includes first surface and second surface established opposite to each other in a thickness direction thereof, the convex portion is connected to the body and protrudes from the first surface, the concave portion is provided on the second surface and corresponds to the position of the convex portion, and the gap control portion is configured to be when the associated connection component is stacked on another connection component, the gap control portion contacts with said another connection component, so as to control a dimension of a gap D between the two connection components to be greater than 0.6H, where H is the height of the convex portion protruding from the first surface; and a mounting module used for connecting the body with the electrode assembly and connecting the convex portion with the electrode terminal.

Additional aspects and advantages of the present disclosure will be given in part in the following descriptions, become apparent in part from the following descriptions, or be learned from practice of the present application.

BRIEF DESCRIPTION OF DRAWINGS

To describe the technical solutions in the embodiments of the present application more clearly, the following briefly introduces the accompanying drawings required for describing the embodiments of the present application. Apparently, the accompanying drawings in the following description show merely some embodiments of the present application, and those skilled in the art may still derive other drawings from the accompanying drawings without inventive efforts.

In the accompanying drawings, the accompanying drawings are not drawn to the actual scale.

Reference labels: 100—battery; 101—box body; 1011—first portion; 1012—second portion; 10—battery cell; 11—electrode terminal; 12—electrode assembly; 121—positive electrode tab; 122—negative electrode tab; 13—connection component; 131—body; 1311—first surface; 1312—second surface; 132—convex portion; 1321—end wall; 1322—side wall; 133—concave portion; 134—gap control portion; 1341—first protrusion; 1342—groove; 1343—step face; 1344—second protrusion; 14—housing; 141—end opening; 15—end cover; 151—first mounting hole; 16—insulating element; 161—second mounting hole; 200—motor; 300—controller; 500—device for manufacturing battery cell; 501—first providing module; 502—second providing module; 503—third providing module; 504—mounting module; and 1000—vehicle.

DESCRIPTION OF EMBODIMENTS

Embodiments of the present disclosure will be further described in detail with reference to the accompanying drawings and embodiments. The detailed description of the following embodiments and the accompanying drawings are used to exemplarily explain the principle of the present application, but shall not be used to limit the scope of the present application, i.e., the present application is not limited to the described embodiments.

In the description of the present application, it should be noted that unless stated otherwise, "a plurality of" means two or more; The orientation or position relationship indicated by the terms "upper", "lower", "left", "right", "inner", "outer", etc. is only used to facilitate describing the present application and simplifying the description, rather than indicating or implying that the indicated device or element must have a specific orientation, be constructed and operated in a specific orientation, and therefore cannot be understood as a limitation to the present application. In addition, the terms "first", "second", "third", etc. are used for descriptive purposes only and are not to be construed as indicating or implying relative importance. "Vertical" is not vertical in the strict sense, but is within the allowable range of error. "Parallel" is not parallel in the strict sense, but is within the allowable range of error.

The orientation words appearing in the following description are all directions shown in the drawings, and do not limit the specific structure of the present application. In the description of the present application, it should also be noted that, unless specified or limited otherwise, the terms "mounted", "connecting" and "connected" should be understood broadly, and may be, for example, fixed connections, detachable connections, or integral connections; and may also be direct connections or indirect connections by means of intervening structures. The specific meanings of the above terms in the present application can be understood by those skilled in the art according to specific situations.

In the present application, a battery cell may include a lithium-ion secondary battery, a lithium-ion primary battery, a lithium-sulfur battery, a sodium-lithium ion battery, a sodium-ion battery, a magnesium-ion battery, etc., and the embodiments of the present application are not limited thereto. The battery cell may be cylindrical, flat, rectangular, or in other shapes, and the embodiments of the present application are not limited thereto. The battery cells are generally divided into three types in a packaging manner a cylindrical battery cell, a square battery cell and a pouch battery cell.

A battery as referred to in the embodiments of the present application refers to a single physical module that includes one or more battery cells so as to provide a high voltage and capacity. For example, the battery mentioned in the present application may include a battery module or a battery pack, etc. The battery generally includes a box body for packaging one or more battery cells. The box body can avoid liquids or other foreign substances affecting charging or discharging of the battery cells.

The battery cell includes an electrode assembly and an electrolyte, and the electrode assembly is composed of a positive electrode sheet, a negative electrode sheet and a separator. The battery cell mainly relies on the movement of metal ions between the positive electrode sheet and the negative electrode sheet to work. A positive electrode sheet includes a positive electrode current collector and a positive electrode active material layer, the positive electrode active material layer is coated on the surface of the positive electrode current collector, the positive electrode current collector uncoated with the positive electrode active material layer protrudes from the positive electrode current collector coated with the positive electrode active material layer, and the positive electrode current collector uncoated with the positive electrode active material layer serves as a positive electrode tab. Taking a lithium-ion battery as an example, the material of the positive electrode current collector may be aluminum, and the positive electrode active material may be lithium cobalt oxide, lithium iron phosphate, threedimensional lithium, lithium manganite oxide, or the like. A negative electrode sheet includes a negative electrode current collector and a negative electrode active material layer, the negative electrode active material layer is coated on the surface of the negative electrode current collector, the positive electrode current collector uncoated with the negative electrode active material layer protrudes from the positive electrode current collector coated with the negative electrode active material layer, and the positive electrode current collector uncoated with the negative electrode active material layer serves as a negative electrode tab. The material of the negative electrode current collector may be copper, and the negative electrode active material may be carbon, silicon, or the like. In order to ensure that high current is passed without fusing, there are a plurality of positive electrode tabs which are stacked together, and there are a plurality of negative electrode tabs which are stacked together. The separator may be made of PP (polypropylene), PE (polyethylene) or the like. In addition, the electrode assembly may be a wound structure or a laminated structure, and the embodiments of the present application are not limited thereto.

The battery cell further includes a connection component and an electrode terminal, the connection component is used for connecting the electrode assembly with the electrode terminal, so as to conduct the electric energy out of the electrode assembly by means of the electrode terminal. Correspondingly, the electrode terminal connected to the positive electrode tab is a positive electrode terminal, and the electrode terminal connected to the negative electrode tab is a negative electrode terminal. In order to achieve the connection between a connection component and an electrode terminal, the connection component includes convex portion, and the convex portion extends into a through-hole of an end cover of a battery cell and is fixed to the electrode terminal; or when an insulating member is provided at one side of the end cover towards the electrode assembly, the convex portion can either pass through the through-hole of the insulating member and extend into the through-hole of the end cover so as to be fixed to the electrode terminal, or be connected to the electrode terminal in the through-hole of the insulating member. Correspondingly, the connection component is provided with a concave portion corresponding to the position of the convex portion.

In the process of manufacturing a battery, in order to reduce space occupation, a plurality of connection components are generally stacked up and down in a tooling fixture, adjacent connection components are prone to stacking sheets and materials, i.e. due to the upper and lower connection components cannot be separated, when taking two or more connection components at a time results in taking materials from the tools fixture. The inventor discovered that the reason for staking sheets and materials of the connection component is that a convex portion and a concave portion are respectively provided at two sides of the connection component, when stacked the convex portion of the connection component will match the concave portion of the adjacent connection component; when the mechanical arm picks up material, due to the weight of the connection component and the lower pressure of the mechanical arm on the connection component, a large area of the convex portion of the lower-layer connection component extends into the concave portion of the upper-layer connection component, or a large area of the convex portion of the upper-layer connection component extends into the concave portion of the lower-layer connection component, resulting in the two connection components to be clamped together.

In view of this, the present application provides a technical solution. A connection component includes body, convex portion, concave portion and gap control portion; the body includes first surface and second surface opposite to each other in the thickness direction of the body; the convex portion is connected to the body and protrudes from the first surface; the concave portion is provided on the second surface and corresponds to the position of the convex portion; the gap control portion is configured to be when the associated connection component is stacked on another connection component, the gap control portion contacts with said another connection component; by means of the contact between the gap control portion and the other connection component, a dimension of a gap D between the two connection components is controlled to be greater than 0.6 H (H is the height of the convex portion protruding from the first surface), so that most area of the convex portion is located outside the concave portion of the other connection component; as the direction of the convex portion from the first surface is parallel to the stack direction, only a part of the convex portion with a height less than or equal to 0.4H is located within the concave portion of the other connection component, and the contact area between the outer surface of the convex portion and the inner surface of the concave portion of the other connection component is relatively small, thereby effectively reducing the risk of material stuck of two connection components, facilitating picking up materials (connection components) in the production process, and improving the production efficiency.

For the convenience of text, the stacking of the two connection components in the embodiments of the present application is the stacking in the direction of gravity.

The technical solutions described in the embodiments of the present application are all applicable to various electric devices that use batteries, such as mobile phones, portable devices, notebook computers, battery cars, electric toys, electric tools, electric vehicles, ships and spacecraft. For example, a spacecraft includes an air plane, a rocket, a space shuttle, a spaceship, and the like.

It should be understood that, the technical solutions described in the embodiments of the present application are not only applicable to the devices as described above, but also applicable to all devices that use batteries. For brevity of description, the following embodiments are all described by using an electric vehicle as an example.

Figure 1:
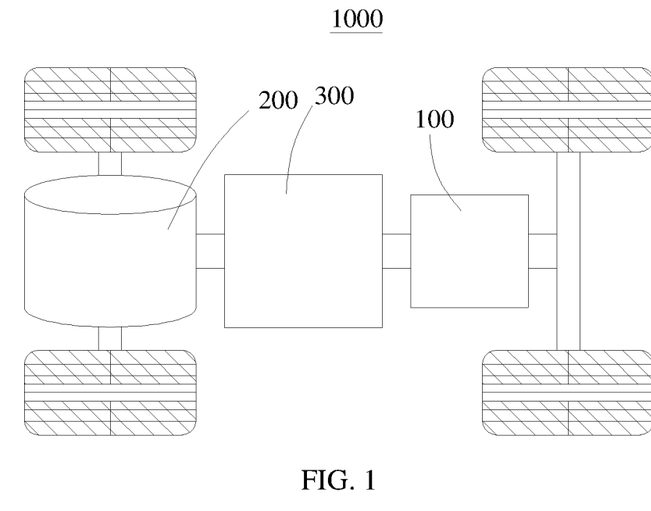
FIG. 1 is a schematic structural diagram of a vehicle according to an embodiment of the present application.

For example, FIG. 1 shows a schematic structural diagram of a vehicle 1000 according to an embodiment of the present application. The vehicle 1000 may be a fuel vehicle, a gas vehicle or a new energy vehicle. The new energy vehicle may be a pure electric vehicle, a hybrid vehicle or an extended-range vehicle. The battery 100 is provided inside the vehicle 1000. For example, the battery 100 may be provided at the bottom or a head or a tail of the vehicle 1000. The battery 100 may be used for power supply of the vehicle 1000. For example, the battery 100 may serve as an operating power source of the vehicle 1000 for a circuit system of the vehicle 1000, for example, for meeting the power consumption requirements of starting, navigation, and running of the vehicle 1000. In another embodiment of the present application, the battery 100 may not only serve as an operating power source of the vehicle 1000, but also serve as a driving power source of the vehicle 1000, instead of or in part replacing fuel oil or natural gas, so as to provide a driving force for the vehicle 1000.

A motor 200 and a controller 300 can also be provided inside the vehicle 1000, and the controller 300 is used for controlling the battery 100 to supply power to the motor 200, for example, for meeting the power consumption requirements of starting, navigation and running of the vehicle 1000.

In order to meet different power usage requirements, the battery 100 may include a plurality of battery cells, where the plurality of battery cells may be connected in series or in parallel or in a mixed manner, and the mixed manner refers to a mixture of connection in series and parallel. The battery 100 may also be referred to as a battery pack. In some embodiments, a plurality of battery cells may be connected in series or parallel or a mixed manner to form a battery module, and then a plurality of battery modules may be connected in series or in parallel or in a mixed manner to form the battery 100. That is to say, the battery 100 may be directly formed by the plurality of battery cells, or a battery module may first be formed, and then the battery 100 is formed by the battery module.

Figure 2:
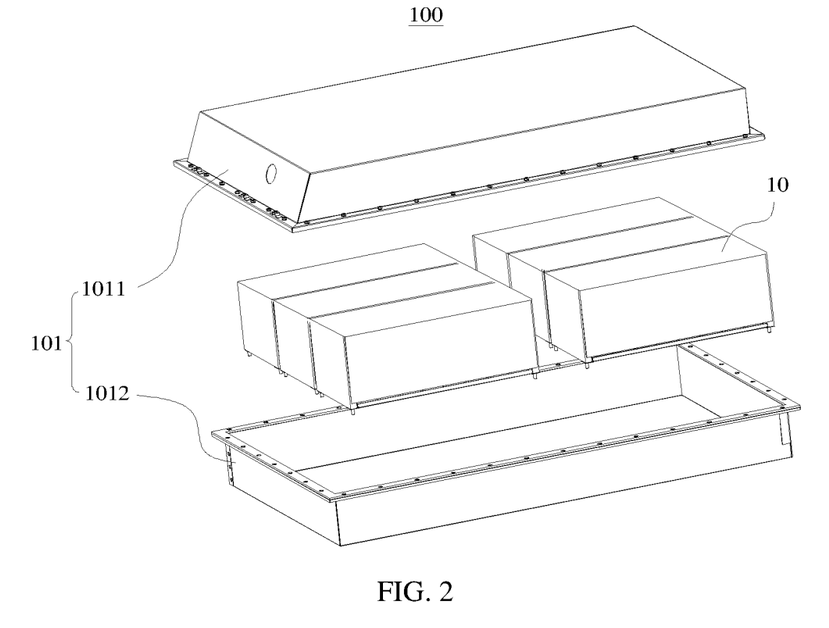
FIG. 2 is a schematic structural diagram of a battery according to an embodiment of the present application.

FIG. 2 shows a schematic structural diagram of a battery 100 according to an embodiment of the present application. In FIG. 2, the battery 100 may include a box body 101 and a plurality of battery cells 10. The inner side of the box body 101 is a hollow structure, and the plurality of battery cells 10 are accommodated inside the box body 101. The box body 101 includes a first portion 1011 and a second portion 1012, where the first portion 1011 includes an accommodation space with an opening, and the second portion 1012 is used for covering at the opening of the accommodation space so as to be connected to the first portion 1011 to form an accommodation cavity for accommodating a plurality of battery cells 10.

Figure 3:
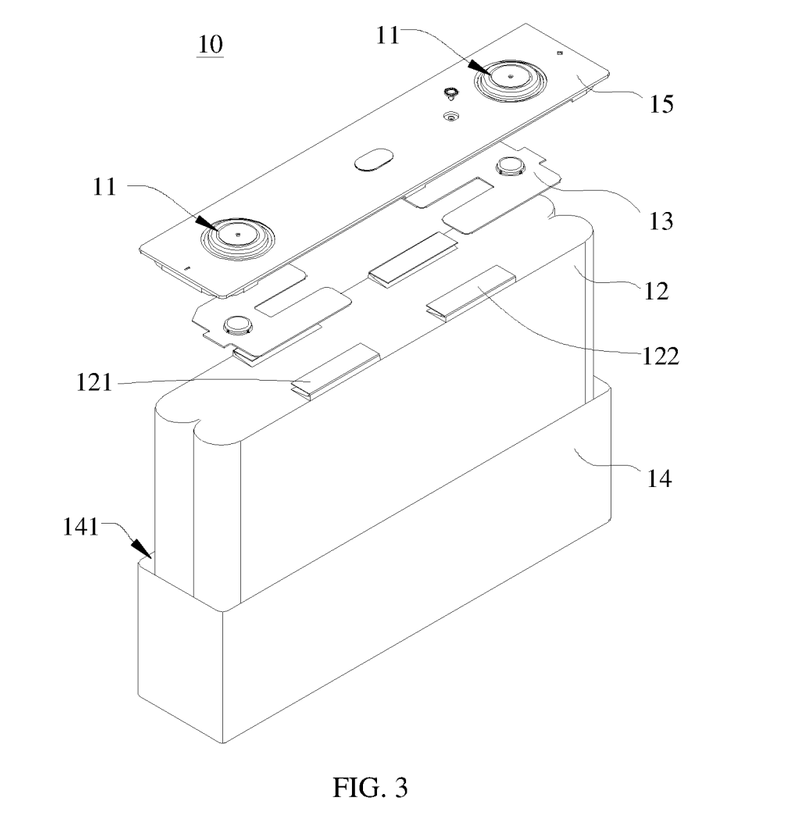
FIG. 3 is an exploded view of a battery cell according to an embodiment of the present application.

FIG. 3 shows an exploded view of a battery cell 10 according to an embodiment of the present application. In FIG. 3, the battery cell 10 includes an electrode terminal 11, an electrode assembly 12, and a connection component 13. Two electrode terminals 11 are provided, and the two electrode terminals 11 are respectively a positive electrode terminal and a negative electrode terminal, where the positive electrode terminal is used for being connected to a positive electrode tab 121 of an electrode assembly 12, and the negative electrode terminal is used for being connected to a negative electrode tab 122 of the electrode assembly 12. The connection component 13 is used for connecting the electrode assembly 12 and the electrode terminal 11 so as to conduct the electric energy out of the electrode assembly 12 by means of the electrode terminal 11. Two connection components 13 are provided, a positive electrode terminal corresponds to one connection component 13, and a negative electrode terminal corresponds to the other connection component 13.

As shown in FIG. 3, the battery cell 10 further includes a housing 14 and an end cover 15. The housing 14 has an end opening 141, and the electrode assembly 12 and the connection component 13 are accommodated in the housing 14. The shape of housing 14 depends on the shape of one or more electrode assemblies 12. For example, the housing 14 may be a hollow cuboid or a hollow cube or a hollow cylinder. For example, as shown in FIG. 3, the housing 14 is a hollow cuboid. The housing 14 may be made of a conductive metal material or plastic. Optionally, the housing 14 may be made of aluminum or aluminum alloy.

Figure 4:
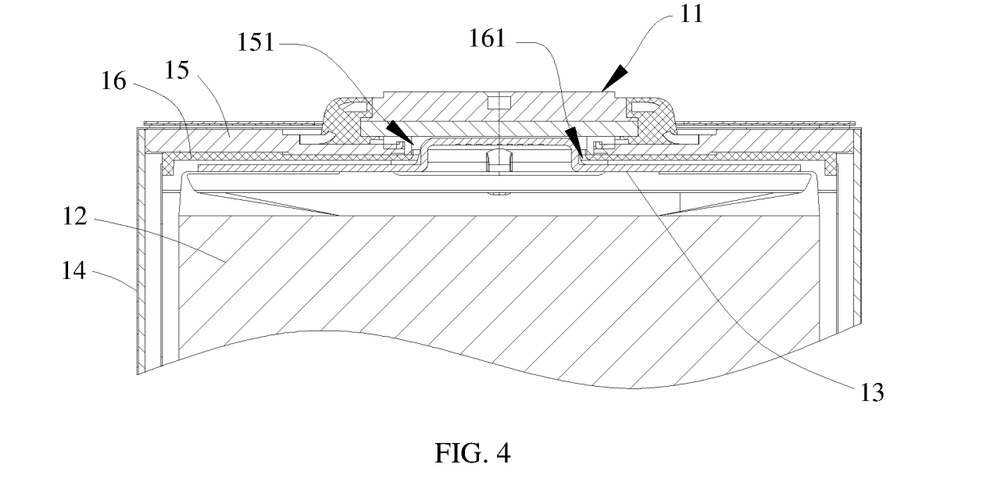
FIG. 4 is a partial sectional view of a battery cell according to an embodiment of the present application.

The end cover 15 is configured to be provided at the end opening 141, so as to form a cavity for accommodating the electrode assembly 12 with the housing 14. The electrode terminal 11 is provided on the end cover 15, and the connection component 13 is located on one side of the end cover 15 facing the electrode assembly 12. FIG. 4 shows a sectional view of a battery cell 10 according to an embodiment of the present application. In FIG. 4, in order to facilitate the connection between a connection component 13 and an electrode terminal 11, first mounting holes 151 is provided on and piercing through the end cover 15, and the number of said two first mounting holes 151 is two; the two first mounting holes 151 correspond to the two electrode terminals 11 respectively; and the connection component 13 is connected to the electrode terminal 11 at the first mounting hole 151.

The battery cell 10 can also include an insulating member 16, and the insulating member 16 is provided at one side of the end cover 15 close to the electrode assembly 12 and is used for isolating the end cover 15 and the connection component 13; the insulating member 16 is provided with a second mounting hole 161 which is through hole; the second mounting hole 161 is provided coaxially with the first mounting hole 151; the connection component 13 either passes through the second mounting hole 161 and extends into the first mounting hole 151 so as to be fixed to the electrode terminal 11 or connects to the electrode terminal 11 in the second mounting hole 161.

Figure 5:
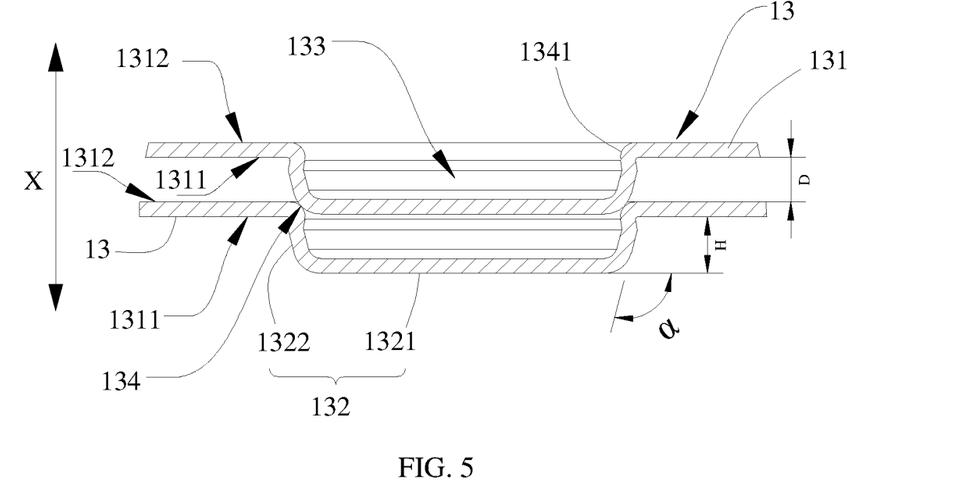
FIG. 5 is a partial sectional view of two connection components in a stacked state according to an embodiment of the present application.
Figure 6:
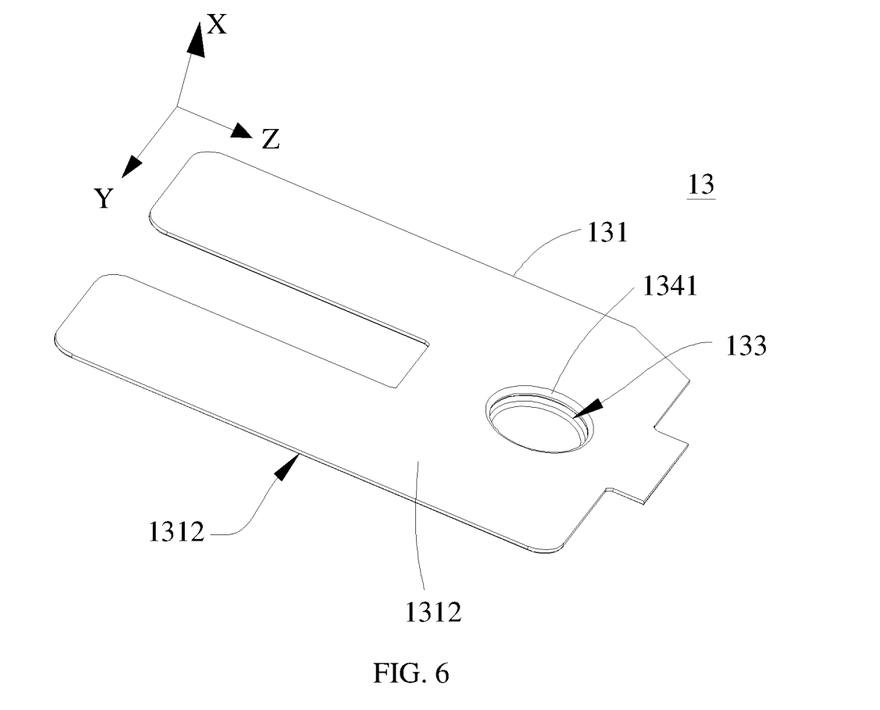
FIG. 6 is a schematic structural diagram of a connection component according to an embodiment of the present application.

FIG. 5 shows a partial sectional view of two connection components 13 in a stacked state according to an embodiment of the present application; and FIG. 6 shows a structural diagram of the connection component 13 according to an embodiment of the present application. In FIGS. 5 and 6, the connection component 13 includes a body 131, a convex portion 132, a concave portion 133, and a gap control portion 134. The body 131 includes a first surface 1311 and a second surface 1312 opposite to each other in a thickness direction thereof, and the thickness direction of the body 131 is the X direction in the figure. In a state in which the connection component 13 is assembled to the battery cell 10, the first surface 1311 is configured to be away from the electrode assembly 12, the second surface 1312 is configured to face the electrode assembly 12, and the second surface 1312 of the body 131 is used for being connected to the electrode assembly 12. The convex portion 132 is connected to the body 131 and protrudes from the first surface 1311, i.e. the convex portion 132 protrudes from the first surface 1311 in the X direction, and the height direction of the convex portion 132 is the X direction. When the convex portion 132 is assembled to the end cover 15, at least a part of the convex portion 132 may be configured to extend into the first mounting hole 151 to be connected to the electrode terminal 11, or when an insulating member 16 is provided at a side of the end cover 15 close to the electrode assembly 12, at least a part of the convex portion 132 may also be configured to extend into the second mounting hole 161 to be connected to the electrode terminal 11, or at least a part of the convex portion 132 may also be configured to extend through the second mounting hole 161 to be connected to the electrode terminal 11 in the first mounting hole 151. The concave portion 133 is provided on the second surface 1312 and corresponds to the position of the convex portion 132. As shown in FIG. 5, the gap control portion 134 is configured to contact with the upper-layer connection component 13 when the lower connection component 13 is stacked with the upper-layer connection component 13, so as to control a dimension of a gap D between the two connection components 13 to be greater than 0.6H, where H is the height of the convex portion 132 protruding from the first surface 1311. In other words, a part with a dimension exceeding 0.6H of the convex portion 132 is located outside the concave portion 133.

It should be noted that the gap D between the two stacked connection components 13 may be an interval between the bodies 131 of the two connection components 13 in the stacking direction (X direction). In the embodiments of the present application, the stacking direction of the connection components 13 is described by taking the up-down direction as an example, and the convex portion of the connection components 13 are provided downwards, that is, the stacking direction is the X direction in the figure, and the X direction may be the thickness direction of the connection components 13. For example, as shown in FIG. 5, taking the example that the two connection components 13 are stacked in the direction of gravity and the convex portion 132 is provided downwards, the gap D between the two connection components 13 may be the interval between the second surface 1312 of the lower connection component 13 and the first surface 1311 of the upper connection component 13.

The concave portion 133 of the connection component 13 corresponds to the convex portion 132, that is, the concave portion 133 is formed on the second surface 1312 while the convex portion 132 is formed on the first surface 1311 at the same time during the manufacturing. When the two connection components 13 are stacked, the convex portion 132 of the upper-layer connection component 13 corresponds to concave portion 133 of the lower-layer connection component 13.

According to the connection component 13 of the embodiments of the present application, the connection component 13 is provided with a gap control portion 134, and when the two connection components 13 are stacked up and down, the convex portion 132 of the upper-layer connection component 13 corresponds to the concave portion 133 of the lower-layer connection component 13, and the gap control portion 134 of the lower-layer connection component 13 is in contact with the upper-layer connection component 13, or the gap control portion 134 of the upper-layer connection component 13 is in contact with the lower-layer connection component 13. By means of the gap control portion 134, the dimension of the gap D between the two connection components 13 can be controlled to be greater than 0.6H, so that a large area of the convex portion 132 of the upper-layer connection component 13 is located outside the concave portion 133 of the lower-layer connection component 13, thereby reducing the overlapping area between the two connection components 13, reducing the contact area between the outer surface of the convex portion 132 and the inner surface of the concave portion 133, effectively reducing the risk of material stuck of the two stacked connection components 13, facilitating picking up only one connection component 13 when picking up materials (the connection components 13) during production, and improving the production efficiency. It should be noted that, the inner surface of the concave portion 133 refers to a surface enclosing the concave portion 133; and the outer surface of the convex portion 132 refers to a surface of the convex portion 132 away from the concave portion 133, that is, a surface of the convex portion 132 exposed towards the first surface 1311 of the body 131.

It should be noted that in the X direction, when a part with the height greater than 0.4H of the convex portion 132 extends into the concave portion 133, the risk of material stuck of the two connection components 13 increases; that is to say, when a part with a height greater than 0.4H of the convex portion 132 of the upper layer connection component 13 extends into the concave portion 133 of the lower layer connection component 13, the probability that the outer surface of convex portion 132 is in contact with the inner surface of concave portion 133 will increase, being easy to cause the material stuck of the two connection components. Therefore, the gap control portion 134 in the present application is configured to control a part with height of less than or equal to 0.4H of the convex portion 132 of the upper-layer connection component 13 to protrude into the concave portion 133 of the lower-layer connection component 13, that is, control the dimension of the gap D between the upper-layer connection component 13 and the lower-layer connection component 13 to be greater than 0.6H.

Optionally, the gap control portion 134 is configured to control the dimension of the gap D between the two connection components 13 to be equal to or greater than 0.8H.

According to some embodiments of the present application, the convex portion 132 includes an end wall 1321 and a side wall 1322, the side wall 1322 is provided around the end wall 1321, the side wall 1322 is connected to the body 131, and the concave portion 133 is enclosed and formed by the end wall 1321 and the side wall 1322. In other words, the side wall 1322 is located between the end wall 1321 and the body 131, that is, the side wall 1322 is connected to the end wall 1321 and the body 131; and one end of where the side wall 1322 connects with the body 131 is an opening end of the concave portion 133, and the end wall 1321 is a closed end of the concave portion 133. The end wall 1321 is used for be connected to the electrode terminal 11.

According to some embodiments of the application, an included angle α between the side wall 1322 and the end wall 1321 is greater than 90°. That is to say, in the X direction, the cross-sectional dimension of the convex portion 132 is gradually reduced in a direction from one end close to the first surface 1311 towards the end wall 1321; in other words, the convex portion 132 has a tapered structure. It should be noted that the cross-sectional dimension of the convex portion 132 refers to the dimension of the cross-section of the convex portion 132 perpendicular to the X direction. The arrangement method as mentioned above, on the one hand, is adapted to the first mounting hole 151 of the end cover 15, so that the end wall 1321 of the convex portion 132 is convenient to extend into the first mounting hole 151 of the end cover 15; on the other hand, an included angle α between the side wall 1322 and the end wall 1321 is set to be an obtuse angle, thereby facilitating processing and manufacturing, for example, facilitating demolding.

According to some embodiments of the present application, the body 131, the convex portion 132 and the concave portion 133 are integrally formed. For example, the connection component 13 is formed by stamping, after the convex portion 132 is stamped on the first surface 1311 of the body 131, the second surface 1312 of the body 131 is formed a concave portion 133, facilitating processing.

According to some embodiments of the present application, the gap control portion 134 may be provided on the convex portion 132. In this case, the gap D between the two connection components 13 may be embodied by a depth of the convex portion 132 of the upper connection component 13 entering the concave portion 133 of the lower connection component 13, that is, the gap D is obtained by subtracting a depth of the convex portion 132 of the upper-layer connection component 13 entering the concave portion 133 of the lower-layer connection component 13 from a height H of the convex portion 132 protruding from the first surface 1311. The gap control component 134 is used for controlling the depth of the convex component 132 of the upper-layer connection component 13 entering the concave component 133 of the lower-layer connection component 13, thereby reducing or avoiding the risk of material stuck of the two overlapped connection components 13, improving the production efficiency.

According to some embodiments of the present application, as shown in FIGS. 5 and 6, the gap control portion 134 may include a first protrusion 1341, and the first protrusion 1341 may be provided at the connecting portion of the protrusion 132 and the body 131 and be exposed to the second surface 1312, that is, the first protrusion 1341 is located at an opening end of the concave portion 133. As shown in FIG. 5, when the two connection components 13 are stacked, the first protrusion 1341 of the lower-layer connection component 13 is in contact with the protrusion 132 of the upper-layer connection component 13. The above-mentioned embodiments possess a simple structure ensuring the convex portion 132 of the upper-layer connection component 13 is limited to enter the concave portion 133 of the lower-layer connection component 13 when the two connection components 13 are stacked by means of establishing the first protrusion 1341, reducing the overlapping area of the two connection components 13, providing a good effect of gap control, reducing or avoiding the risk of material stuck of the two connection components 13, and improving the production efficiency.

According to some embodiments of the present application, as shown in FIG. 6, the first protrusion 1341 is an annular protrusion extending in a circumferential direction of the protrusion 132. When the first protrusion 1341 is an annular protrusion and the two connection components 13 are stacked, the first protrusion 1341 of the lower-layer connection component 13 has a relatively large contact area with the upper-layer connection component 13, thereby having a stable stacking support of the two connection components 13, effectively controlling the depth of the convex portion 132 of the upper-layer connection component 13 entering the concave portion 133 of the lower-layer connection component 13, reducing the risk of material stuck on the two connection components 13, and improving the production efficiency.

Figure 7:
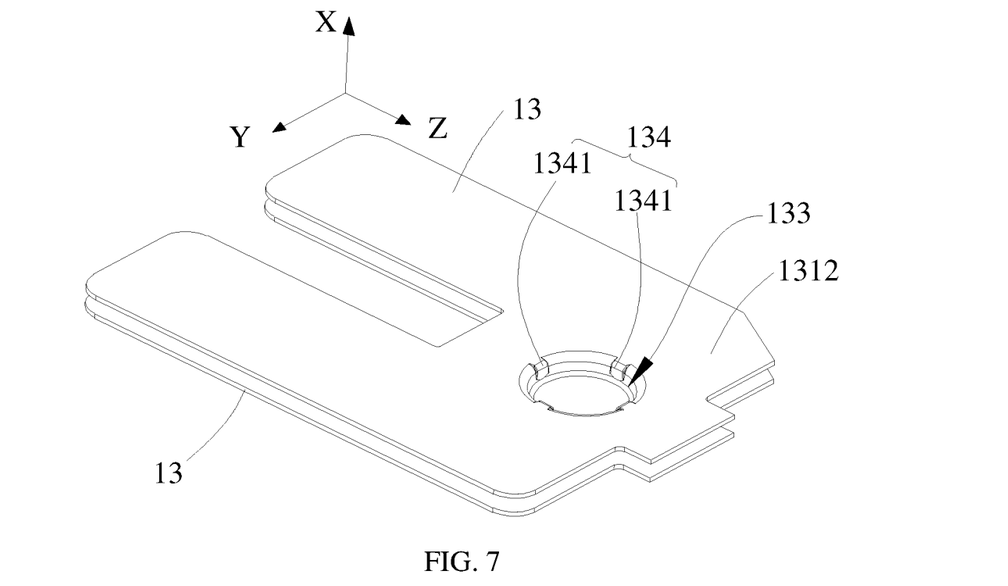
FIG. 7 is a schematic diagram of a plurality of first protrusions of a connection component according to an embodiment of the present application.
Figure 8:
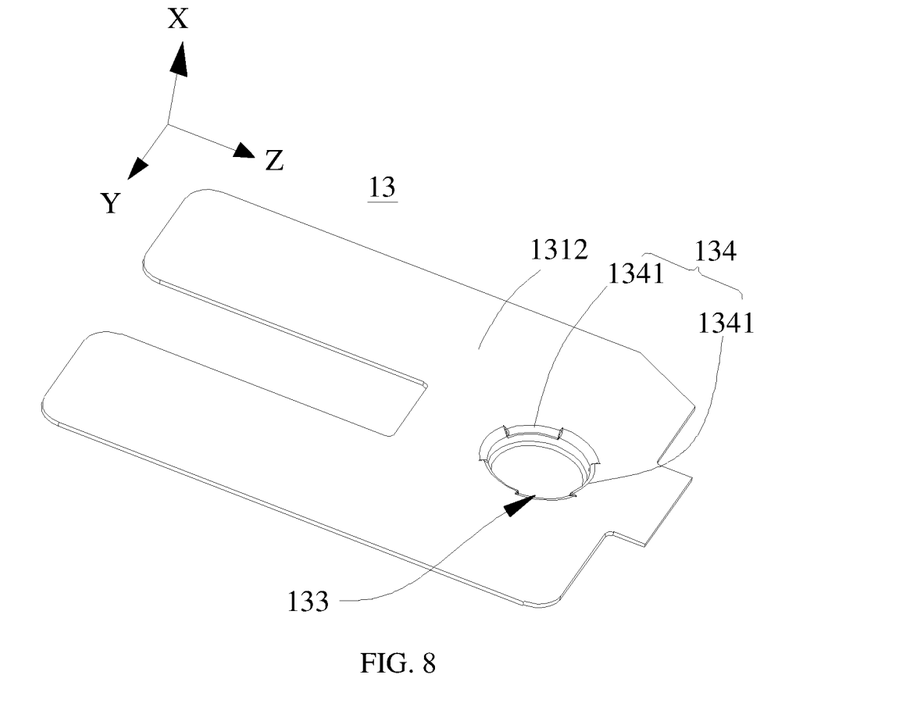
FIG. 8 is a schematic diagram of a plurality of first protrusions of a connection component according to another embodiment of the present application.

Alternatively, FIG. 7 shows a schematic diagram of a plurality of first protrusions 1341 of a connection component 13 according to an embodiment of the present application, and FIG. 8 shows a schematic diagram of a plurality of first protrusions 1341 of a connection component 13 according to another embodiment of the present application. As shown in FIGS. 7 and 8, there are a plurality of first protrusions 1341, and said plurality of first protrusions 1341 are distributed in the circumferential direction of the convex portion 132 at intervals. In the case that there are a plurality of first protrusions 1341 and when the two connection components 13 are stacked, said plurality of first protrusions 1341 can increase the contact positions of the two connection components 13 in the circumferential direction of the convex portion 132, so that to form a plurality of positions for stacking support of the connection components 13, thereby ensuring the stability of the stacking support of the two connection components 13, effectively controlling the depth of the convex portion 132 of the upper-layer connection component 13 entering the concave portion 133 of the lower-layer connection component 13, reducing the risk of material stuck on the two connection components 13, and improving the production efficiency.

It should be noted that, when there are a plurality of first protrusions 1341 and said plurality of first protrusions 1341 are distributed in the circumferential direction of the convex portion 132 at intervals, as shown in FIG. 7, the first protrusion 1341 may be a block-shaped structure, or, as shown in FIG. 8, the first protrusion 1341 may also be a strip-shaped structure extending in the circumferential direction of the convex portion 132.

Figure 9:
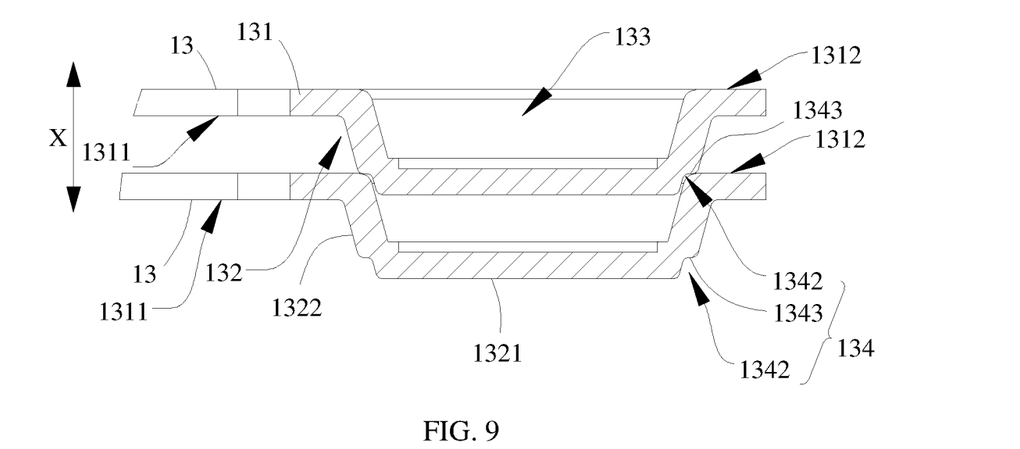
FIG. 9 is a schematic diagram of a groove of a connection component according to an embodiment of the present application.

According to some embodiments of the present application, FIG. 9 shows a schematic diagram of a groove of a connection component 13 according to an embodiment of the present application. FIG. 9 is a partial cross-sectional view of a stacked state of two connection components. As shown in FIG. 9, a gap control portion 134 may include groove 1342, said groove 1342 is provided on an outer surface of a convex portion 132 and is located at a connecting portion of an end wall 1321 and a side wall 1322, the groove 1342 is an annular groove enclosing the end wall 1321, and the groove 1342 forms an annular step surface 1343 on the side wall 1322. When the two connection components 13 are stacked, the groove 1342 of the upper-layer connection component 13 is matched with the body 131 of the lower-layer connection component 13, that is, the step face 1343 of the upper-layer connection component 13 is in contact with the second surface 1312 of the lower-layer connection component 13, controlling the depth of the convex portion 132 of the upper-layer connection component 13 entering the concave portion 133 of the lower-layer connection component 13, being able to effectively control the gap between two adjacent stacked connection components 13, reducing or avoiding the risk of material stuck, and improving the production efficiency.

According to some embodiments of the present application, the gap control portion 134 may also be provided on the body 131. In this case, when the two connection components 13 are stacked, by means of contacting the body 131 of the lower-layer connection component 13 with the gap control portion 134 of the upper-layer connection component 13, and/or contacting the body 131 of the upper connection component 13 with the gap control portion 134 of the lower-layer connection component 13, to control the dimension of the gap D between the two connection components 13 to be greater than 0.6H, that is, control the depth of the convex portion 132 of the upper-layer connection component 13 entering the concave portion 133 of the lower-layer connection component 13 to be less than 0.4H, thereby reducing or avoiding the risk of material stuck of the stacked two connection components 13, and improving the production efficiency.

Figure 10:
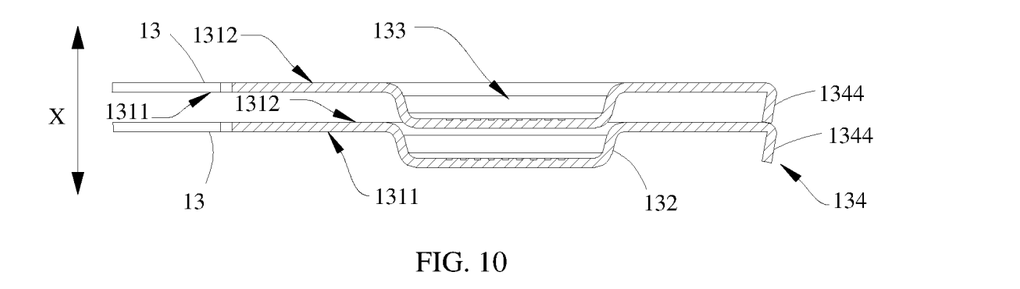
FIG. 10 is a schematic diagram of a second protrusion of a connection component according to an embodiment of the present application.
Figure 11:
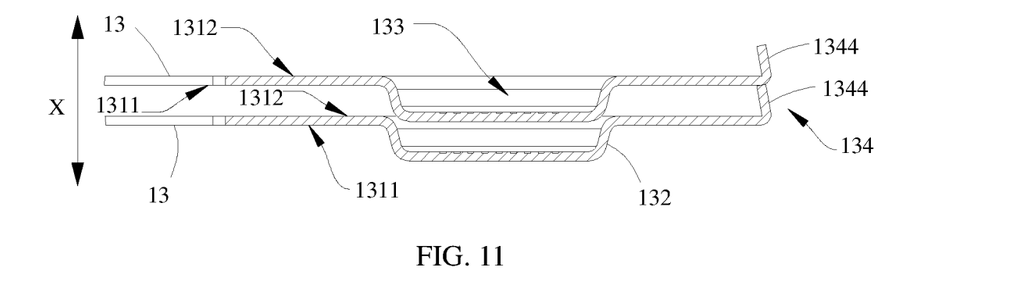
FIG. 11 is a schematic diagram of a second protrusion of a connection component according to another embodiment of the present application.

According to some embodiments of the present application, the gap control portion 134 may include second protrusion, said second protrusion is provided on the body 131 and protrudes from the first surface 1311 and/or the second surface 1312. For example, the second protrusion 1344 may protrude from the first surface 1311 and the second surface 1312. In this case, there are a plurality of second protrusions 1344. A part of the second protrusions 1344 protrude from the first surface 1311, and the other part of the second protrusions 1344 protrude from the second surface 1312. When the two connection components 13 are stacked, the second protrusion 1344 of the upper-layer connection component 13 protruding from the first surface 1311 is in contact with the second surface 1312 of the lower-layer connection component 13, and the second protrusion 1344 of the lower-layer connection component 13 protruding from the second surface 1312 is in contact with the first surface 1311 of the upper-layer connection component 13. Alternatively, FIG. 10 shows a schematic diagram of a second protrusion 1344 of a connection component 13 according to an embodiment of the present application. As shown in FIG. 10, the second protrusion 1344 may only protrude from a first surface 1311, and the second protrusion 1344 of an upper-layer connection component 13 protruding from the first surface 1311 is in contact with a second surface 1312 of a lower-layer connection component 13. Still alternatively, FIG. 11 shows a schematic diagram of a second protrusion 1344 of a connection component 13 according to another embodiment of the present application. As shown in FIG. 11, the second protrusion 1344 may only protrude from a second surface 1312, and the second protrusion 1344 of the lower-layer connection component 13 protruding from the second surface 1312 is in contact with the first surface 1311 of the upper-layer connection component 13. By means of establishing the second protrusion 1344 on the body 131, when the two connection components 13 are stacked, the gap between the two connection components 13 is effectively controlled, reducing or avoiding the risk of material stuck of the two stacked connection components 13, and improving the production efficiency.

According to some embodiments of the present application, as shown in FIG. 10, the second protrusion 1344 protrudes from the first surface 1311 and is obliquely provided towards the concave portion 132; or, as shown in FIG. 11, the second protrusion 1344 protrudes from the second surface 1312 and is obliquely provided towards the concave portion 133. When the two connection components 13 are stacked, as the second protrusion 1344 is obliquely provided towards the convex portion 132, the second protrusion 1344 is subjected to the gravity or external force of the other connecting member 13 so as to drive the second protrusion 1344 to deform towards the protrusion 132, but as the second protrusion 1344 itself inclines towards the convex portion 132, and the second protrusion 1344 has great difficulty in deformation, thereby being able to effectively control the depth of the convex portion 132 of the upper-layer connection component 13 entering the concave portion 133 of the lower-layer connection component 13, and reducing the risk of material stuck.

Figure 12:
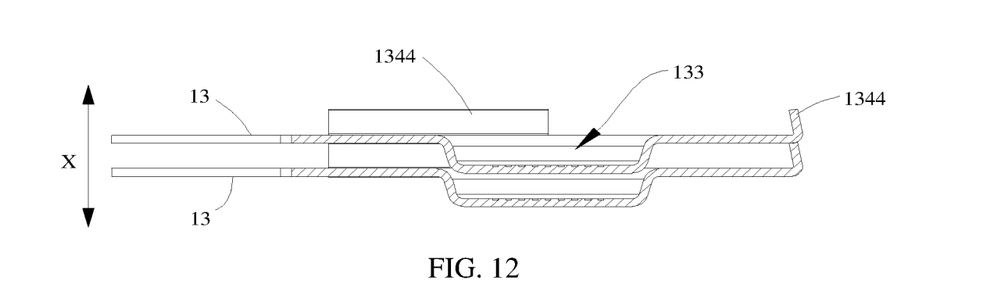
FIG. 12 is a partial sectional view of two connection components in a stacked state provided by another embodiment of the present application.
Figure 13:
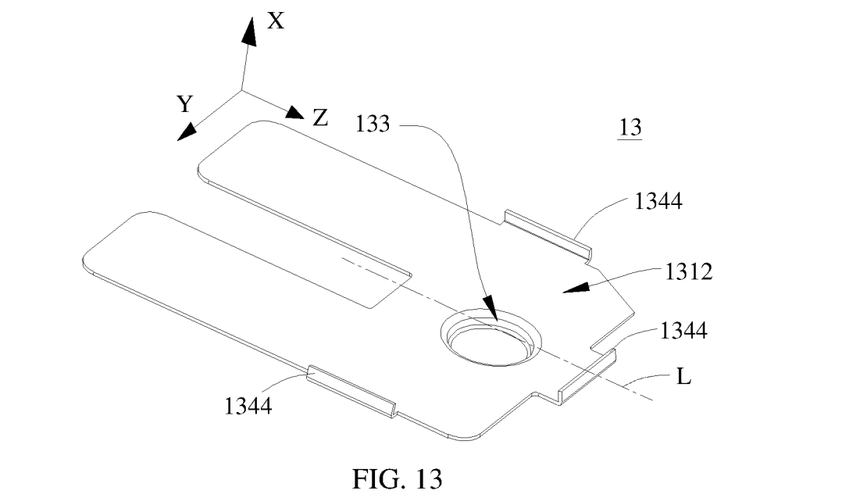
FIG. 13 is a schematic structural diagram of a connection component provided in FIG. 12.

FIG. 12 shows a partial cross-sectional view of two connection components 13 in a stacked state according to an embodiment of the present application; and FIG. 13 shows a structural diagram of the connection component 13 of FIG. 12. According to some embodiments of the present application, there are a plurality of second protrusions 1344, a plurality of second protrusions 1344 are provided surrounding the concave portion 133 at intervals. As shown in FIGS. 12 and 13, taking the second protrusion 1344 protruding from the second surface 1312 as an example, a plurality of second protrusions 1344 are provided surrounding the concave portion 133 at intervals, so as to form a plurality of support positions in the vicinity of the concave portion 133. A plurality of second protrusions 1344 is provided, thereby achieving the two connection components 13 being in contact at a plurality of support positions, ensuring stable stacking support, improving the effect of controlling the gap between the stacked two connection components 13, reducing or avoiding material stuck of the stacked two connection components 13, and improving the production efficiency.

According to some embodiments of the present application, as shown in FIGS. 12 and 13, the convex portion 132 is located on the width central line L of the connection component 13, and a plurality of second protrusions 1344 are symmetrically distributed with respect to the width central line L. For example, as shown in FIG. 13, when a plurality of second protrusion 1344 are provided, a part of the second protrusions 134 extend along the Y direction, and the other part of the second protrusions 1344 extend along the Z direction, and the Z direction in the figure represents a length direction of the connection component 13. The plurality of second protrusions 1344 are symmetrically distributed, thereby ensuring stable stacking support of the two connection components 13 when the two connection components 13 are stacked, and facilitating controlling the gap between the two connection components 13. It should be noted that the Y direction in the figure represents a width direction of the connection component 13, and a width central line L of the connection component 13 represents a central line in the Y direction of the connection component 13.

According to some embodiments of the present disclosure, at least one second protrusion 1344 is provided at an edge of the body 131, facilitating processing and manufacturing.

For example, as shown in FIG. 13, all of the second protrusions 1344 are provided at an edge of the body 131. When the second protrusion 1344 and the body 131 are integrally formed, for example, when the connection component 13 is stamped and formed, the second protrusion 1344 may be formed by bending the edge of the body 131.

According to some embodiments of the present application, all the second protrusion 1344 is provided between the edge of the body 131 and the concave portion 133, thereby effectively controlling the gap D between the two connection components 13 when the two connection components 13 are stacked, reducing or avoiding the risk of material stuck of the stacked two connection components 13, and improving the production efficiency.

When the second protrusion 1344 is integrally formed on the body 131, a through groove is formed between an edge of the body 131 and the concave portion 133, one end of the second protrusion 1344 is connected to a wall of the groove, and the other end of the second protrusion 1344 extends in a direction away from the body 131; alternatively, when the second protrusion 1344 is separately provided from the body 131, the second protrusion 1344 is fixed between an edge of the body 131 and the concave portion 133 by means of welding or riveting.

Figure 14:
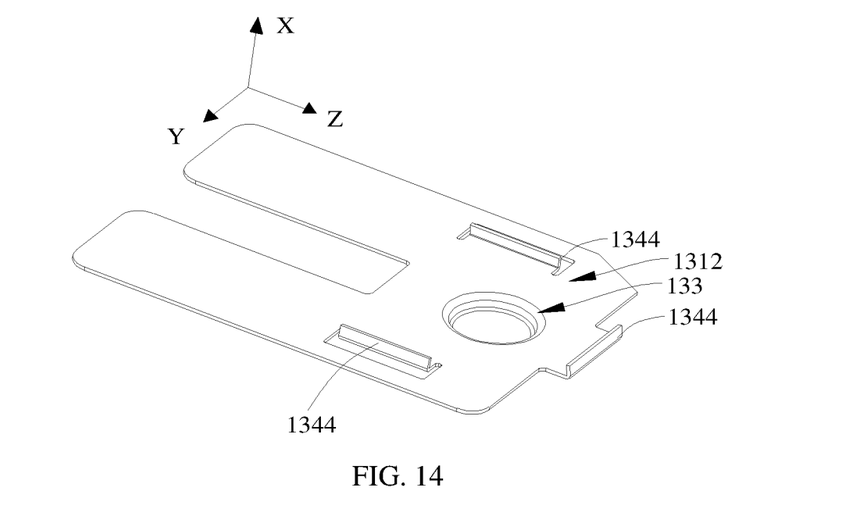
FIG. 14 is a schematic structural diagram of a connection component according to another embodiment of the present invention.

Still alternatively, FIG. 14 shows a schematic structural diagram of a connection component 13 according to another embodiment of the present application. As shown in FIG. 14, one second protrusion 1344 is provided at an edge of a body 131, and two second protrusions 1344 are provided between an edge of the body 131 and the concave portion 133.

According to some embodiments of the present application, the second protrusion 1344 may be integrally formed on the body 131, or the second protrusion 1344 may also be separately provided from the body 131, and the second protrusion 1344 is fixed to the body 131, for example, the second protrusion 1344 is welded, riveted, or adhered by a conductive adhesive to the body 131.

Figure 15:
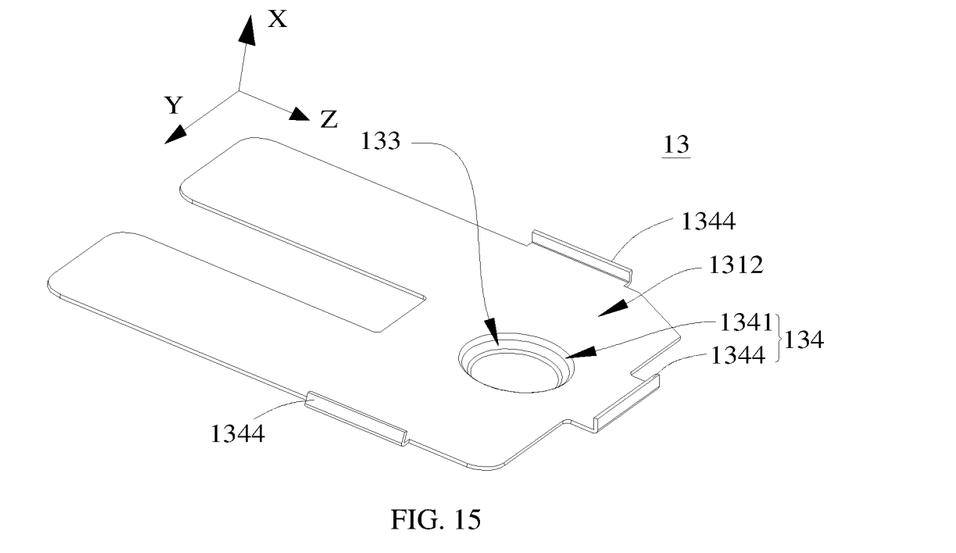
FIG. 15 is a schematic structural diagram of a connection component according to still another embodiment of the present invention.

FIG. 15 shows a structural diagram of the connection component 13 according to still another embodiment of the present application. According to some embodiments of the present application, as shown in FIG. 15, the gap control portion 134 may also be provided on the convex portion 132 and the body 131, that is, the gap control portion 134 can further include a first protrusion 1341 and a second protrusion 1344. When the two connection components 13 are stacked, the gap between the two connection components 13 is controlled by the first protrusion 1341 and the second protrusion 1344 simultaneously.

Figure 16:
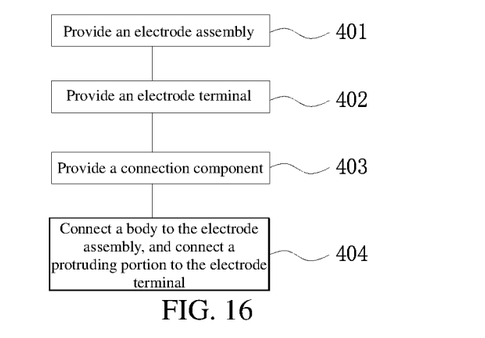
FIG. 16 is a schematic flowchart of a method for manufacturing a battery cell according to an embodiment of the present application.

FIG. 16 is a schematic flowchart of a method for manufacturing a battery cell 10 according to an embodiment of the present application. As shown in FIG. 16, the method may include:

401, providing an electrode assembly 12;
402, providing an electrode terminal 11;
403, providing a connection component 13, the connection component 13 including a body 131, a convex portion 132, a concave portion 133 and a gap control portion 134, where the body 131 includes a first surface 1311 and a second surface 1312 opposite to each other in a thickness direction thereof; the convex portion 132 is connected to the body 131 and protrudes from the first surface 1311, and the concave portion 133 is provided on the second surface 1312 and corresponds to the position of the convex portion 132; the gap control portion 134 is configured to be in contact with the upper-layer connection component 13 when the lower-layer connection component 13 is stacked on the upper-layer connection component 13, and/or the gap control portion 134 is configured to be in contact with the lower-layer connection component 13 when the upper-layer connection component 13 is stacked on the lower-layer connection component 13, so as to control a dimension of a gap D between the two connection components 13 to be greater than 0.6H, where H is the height of the convex portion 132 protruding from the first surface 1311; and

404, connecting the body 131 to the electrode assembly 12, and connecting the protruding portion 132 to the electrode terminal 11.

It should be noted that, the order of step "401, providing an electrode assembly 12", step "402, providing an electrode terminal 11" and step "403, providing a connection component 13" is not limited, for example, step "402, providing an electrode terminal 11", step "401, providing an electrode assembly 12" and step "403, providing a connection component 13" may be performed sequentially, and step "403, providing a connection component 13", step "401, providing an electrode assembly 12" and step "402, providing an electrode terminal 11" may also be performed sequentially.

Figure 17:
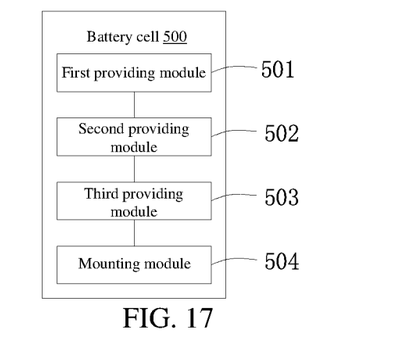
FIG. 17 is a schematic block diagram of a device for manufacturing a battery cell according to an embodiment of the present disclosure.

FIG. 17 is a schematic block diagram of a device 500 for manufacturing a battery cell according to an embodiment of the present application. As shown in FIG. 17, the device for manufacturing a battery cell 500 may include a first providing module 501, a second providing module 502, a third providing module 503, and a mounting module 504.

The first providing module 501 is used for providing electrode assembly 12. The second providing module 502 is used for providing electrode terminal 11. The third providing module 503 is used for providing connection component 13; the connection component 13 includes a body 131, a convex portion 132, a concave portion 133 and a gap control portion 134; the body 131 includes a first surface 1311 and a second surface 1312 opposite to each other in a thickness direction thereof; the convex portion 132 is connected to the body 131 and protrudes from the first surface 1311, and the concave portion 133 is provided on the second surface 1312 and corresponds to the position of the convex portion 132; the gap control portion 134 is configured to be in contact with the upper-layer connection component 13 when the lower-layer connection component 13 is stacked on the upper-layer connection component 13, and/or the gap control portion 134 is configured to be in contact with the lower-layer connection component 13 when the upper-layer connection component 13 is stacked on the lower-layer connection component 13, so as to control a dimension of a gap D between the two connection components 13 to be greater than 0.6H, where H is the height of the convex portion 132 protruding from the first surface 1311.

The mounting module 504 is used for connecting the body 131 with the electrode assembly 12, and is used for connecting the convex portion 132 with the electrode terminal 11.

While the present application has been described with reference to preferred embodiments, various modifications may be made thereto and equivalents may be substituted for components thereof without departing from the scope of the present application. In particular, the technical features mentioned in the embodiments may be combined in any manner as long as there is no structural conflict. The present application is not limited to the specific embodiments disclosed herein, but includes all technical solutions belonging to the scope of the claims.

What is claimed is:

1. A connection component for connecting an electrode assembly and an electrode terminal, wherein the connection component comprises:
 a body, comprising a first surface and a second surface opposite to each other in a thickness direction thereof;
 a convex portion, connected to the body and protruding from the first surface;
 a concave portion, provided on the second surface and corresponding to the position of the convex portion; and
 a gap control portion, configured to be when the connection component is stacked on another connection component, the gap control portion is in contact with the other connection component, so as to control a dimension of a gap D between the two connection components to be greater than 0.6H, wherein H is the height of the convex portion protruding from the first surface;
 wherein the gap control portion comprises a first protrusion, and the first protrusion is provided on the body and protrudes from the first surface and/or the second surface, the first protrusion protrudes from the first surface and is obliquely provided towards the convex portion, or, the first protrusion protrudes from the second surface and is obliquely provided towards the concave portion.

2. The connection component according to claim 1, wherein the convex portion comprises an end wall and a side wall, the side wall is provided surrounding the end wall in the vicinity of the end wall, the side wall is connected to the body, and the concave portion is encircled by the end wall and the side wall.

3. The connection component according to claim 2, wherein an included angle between the side wall and the end wall is greater than 90°.

4. The connection component according to claim 1, wherein the gap control portion comprises a second protrusion, second protrusion is provided at a connecting portion of the convex portion and the body and is exposed to the second surface.

5. The connection component according to claim 4, wherein the second protrusion is an annular protrusion extending in a circumferential direction of the convex portion;
 or, there are a plurality of second protrusions, and a plurality of second protrusions are spaced apart from each other in the circumferential direction of the convex portion.

6. The connection component according to claim 2, wherein the gap control portion comprises a groove, the groove is provided on an outer surface of the convex portion and is located at a connection portion of the end wall and the side wall, and the groove is an annular groove provided circling around the end wall.

7. The connection component according to claim 1, wherein there are a plurality of first protrusions, and the plurality of first protrusions are distributed surrounding the concave portion at intervals.

8. The connection component according to claim 7, wherein the convex portion is located on a width central line of the connection component, and the plurality of first protrusions are symmetrically distributed with respect to the width central line.

9. The connection component according to claim 7, wherein at least one of the first protrusions is provided at an edge of the body.

10. A battery cell comprising:
an electrode assembly;
an electrode terminal; and
the connection component according to claim 1, wherein the body is connected to the electrode assembly, and the convex portion is connected to the electrode terminal.

11. A battery comprising the battery cell according to claim 10.

12. An electrical device comprising the battery cell according to claim 10.

13. A method for manufacturing a battery cell, wherein the method comprises:
providing an electrode assembly;
providing an electrode terminal;
providing a connection component, the connection component comprising a body, a convex portion, a concave portion and a gap control portion, wherein the body comprises a first surface and a second surface opposite to each other in a thickness direction thereof, the convex portion is connected to the body and protrudes from the first surface, the concave portion is provided on the second surface and corresponds to the position of the convex portion, and the gap control portion is configured to be when the connection component is stacked on another connection component, the gap control portion is in contact with the other connection component, so as to control a dimension of a gap D between the two connection components to be greater than 0.6H, wherein H is the height of the convex portion protruding from the first surface; and
connecting the body to the electrode assembly, and connecting the convex portion to the electrode terminal;
wherein the gap control portion comprises a first protrusion, and the first protrusion is provided on the body and protrudes from the first surface and/or the second surface, the first protrusion protrudes from the first surface and is obliquely provided towards the convex portion, or, the first protrusion protrudes from the second surface and is obliquely provided towards the concave portion.

14. A device for manufacturing a battery cell, wherein the device comprises:
a first providing module, used for providing an electrode assembly;
a second providing module, used for providing an electrode terminal;
a third providing module, used for providing a connection component, the connection component comprising a body, a convex portion, a concave portion and a gap control portion, wherein the body comprises a first surface and a second surface opposite to each other in a thickness direction thereof, the convex portion is connected to the body and protrudes from the first surface, the concave portion is provided on the second surface and corresponds to the position of the convex portion, and the gap control portion is configured to be when the connection component is stacked on another connection component, the gap control portion is in contact with the other connection component, so as to control a dimension of a gap D between the two connection components to be greater than 0.6H, wherein H is the height of the convex portion protruding from the first surface; and
a mounting module, used for connecting the body with the electrode assembly and used for connecting the convex portion with the electrode terminal;
wherein the gap control portion comprises a first protrusion, and the first protrusion is provided on the body and protrudes from the first surface and/or the second surface, the first protrusion protrudes from the first surface and is obliquely provided towards the convex portion, or, the first protrusion protrudes from the second surface and is obliquely provided towards the concave portion.

* * * * *